(12) United States Patent
Sharma

(10) Patent No.: US 6,249,818 B1
(45) Date of Patent: Jun. 19, 2001

(54) NETWORK TRANSPORT DRIVER INTERFACING

(75) Inventor: Dushyant Sharma, Lowell, MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/085,505

(22) Filed: Jun. 30, 1993

(51) Int. Cl.$^7$ ............................................ G06F 15/16
(52) U.S. Cl. ................................. 709/230; 709/229
(58) Field of Search ............................. 395/200, 800, 395/725, 600, 500, 650, 60, 200.16; 709/230, 201, 203, 229, 227; 370/229, 466, 416

(56) References Cited

U.S. PATENT DOCUMENTS

| | | | |
|---|---|---|---|
| 4,614,841 | * 9/1986 | Babecki et al. | 379/98 |
| 5,224,098 | * 6/1993 | Bird et al. | 395/800 |
| 5,261,051 | * 11/1993 | Masden et al. | 395/200 |
| 5,265,239 | * 11/1993 | Ardolino | 395/500 |
| 5,265,261 | * 11/1993 | Rubin et al. | 395/800 |
| 5,425,028 | * 6/1995 | Britton et al. | 395/200 |
| 5,490,256 | * 2/1996 | Mooney et al. | 710/100 |

OTHER PUBLICATIONS

Jones, Micorsoft Corporation Company, Portable Systems Group Transport Driver Interface (TDI), pp. 1–82, Revision 1.2 1990.

IBM/Microsoft, Transport Driver Interface (TDI), pp. 1–59, Revision 3, 1991.

Lichtenberg et al., Pathworks Transport Interface Functional Specification pp. 1–79, 1991.

DECnet Programmer's Reference Manual, "C Language Socket Interface" pp. 4.1–4.84.

X/Open Company, Ltd., "X/Open CAE specfication, X/Open Transport Interface (XTI)" pp. 1–200, 1992.

* cited by examiner

Primary Examiner—Mehmet B. Geckil
(74) Attorney, Agent, or Firm—A. Sidney Johnston; Cesari and McKenna, LLP

(57) ABSTRACT

Application programs can dynamically link to multiple transports by attaching and detaching vectors (jump addresses, i.e., entry points to the functions provided by third party transport stack/drivers) of third party transport stack/drivers in a dynamic manner. Notify callbacks are made from the transport stack/driver, allowing asynchronous operation without requiring the application to wait for the transport stack/driver to confirm a network transport operation.

4 Claims, 10 Drawing Sheets

```
/*
 * Connection info
 */
typedef struct (
        DWORD dwSessId;        /* Identifies established connection     */
                               /*OII will return the handle in dwSessId when */
                               /* ReDirectOpen or ReDirectListen completes */

WORD wTransport;       /* requested transport                   */

BOOL bOpenSession;     /* True to creat a session, FALSE to use an */
                               /*existing session. (piggyback)          */

DWORD dwSessionHdl     /* handleof existing session if bOpenSession */
                               /* is FALSE. (from TRAMSLAX.DLL, OpenComm etc)*/

WORD wTimeout;         /*number of seconds before timing out, (use */
                               /*in queue mgr calls) .Set to zero to disable */

/* Status Block is updated when event Occurs */

STATUS_BLK statusBLK;
                               /* status callback when events occur     */
                               /* will be NULL in case No Callback is required */ void (WINAPI *vfpCallback) (DWORD wSessId, WORD wCallId, WORD wType,
        WORD wCount, int nStatus));

/*Use the below Block if bOpenSession    */
                               /* is TRUE and a Transport is specified in */
                               /* wTransport. Otherwise ignore.         */
        union (
            DECNET_BLK  decnetBlk;
            TCPIP_BLK   tcpipBlk;
            COMM_BLK    commBlk;
            NETWARE_BLK netwareBlk;
            .
            .
        ) multi_transport;

GENERIC_TRANSPORT_ADDRESS manyAddress [MAX_TRANSPORT_ADDR];
        GENERIC_TRANSPORT_ADDRESS lem-loAddress;
) OII_CONTROL, far * LP_OII_CONTROL;
```

```
typedef struct (

BOOL wAsynch;

WORD transportId;

BOOL (WINAPI *lpfnDirectOpen) (HANDLE hMem, DWORD wSessId, WORD wCallId, Word wType,
    BOOL (WINAPI *lpfnDirectListen) (HANDLE hMem, DWORD wSessId, WORD wCallId, Word wType,
    void (WINAPI *lpfnCallback) (DWORD wSessId,WORD wCallId, WORD wType,
    WORD wCoount, int nStatus));
    BOOL (WINAPI *lpfnDirectClose) (DWORD wSessId, WORD wCallId, WORD wType);

BOOL (WINAPI *lpfnDirectRead) (DWORD wSessId,WORD wCallId, WORD wType,
        LPBYTE lpbBuffor, WORD wCount);

BOOL (WINAPI *lpfnDirectWrite) (DWORD wSessId,WORD wCallId, WORD wType,
        LPBYTE lpbBuffor, WORD wCount);

int (WINAPI *lpfnStatus) (DWORD wSessId, WORD wCallId, WORD wType);

DWORD specificVectors [MORE_VECTORS];

JUMP_ADDRESS;
```

FIG. 3

```c
typedef struct {
    BYTE byNode [OII_NODE_LEN];         /* node name                                              */
    BYTE byUser [OII_USER_LEN];         /* access information                                     */
    BYTE byPswd [OII_PSWD_LEN];
    BOOL bNullAccess;                   /* TRUE to disable getting default access info            */
                                        /* if both lpazUser and lpazPswd are NULL                 */

BYTE byTask[RFA_TASK_LEN]           /* object or task string                                  */
                                        /* used when connecting to object 0 etc.                  */
                                        /* Set to NULL to ignore/use defaults                     */

WORD wRemotePort;                   /* object or port number for the other node               */
                                        /* set to RFA_PORT_DEFAULT to use defaults                */
} DECNET_BLK;

typedef struct {
    BYTE byNode [OII_NODE_LEN];         /* node name                                              */
    BYTE byUser [OII_USER_LEN];         /* access information                                     */
    BYTE byPswd [OII_PSWD_LEN];
    BOOL bNullAccess;                   /* TRUE to disable getting default access info*/
                                        /* if both lpazUser and lpazPswd are NULL                 */

WORD wLocalPort;                    /* object or port number for the PC                       */
    WORD wRemotePort;                   /* object or port number for the other node               */
                                        /* Set to RFA_PORT_DEFAULT to use defaults                */
} TCPIP_BLK;

typedef struct {
    WORD wSpeed;                        /* modem speed                                            */
    BYTE byFlowControl;                 /* no flow control or xon/xoff                            */
    BYTE byDataBits;                    /* 7 or 8 bit                                             */
    BYTE byParity;                      /* odd, even, or none                                     */
    BYTE byStopBits;                    /* stop bits                                              */
    WORD wModemTimeout;                 /* how long should we wait for modem signals              */
    WORD wRetryLimit;                   /* number of times to retry a packet                      */
    BYTE byCommPort [RFA_COMM_PORT_LEN]; /* LPTn or COMn string                                   */
} COMM_BLK ;
```

FIG. 4

```
/* This could be Station or Hardware Address for any Transport*/
typedef struct ( WORD wtransport;            /* Requested transport       */
    WORD wAddLen ;              /* Transport address Len     */

BYTE bAddress [MAX_ADDRESS_LEN] ;

) GENERIC_TRANSPORT_ADDRESS ;
```

FIG. 5

```
/* Status Block*/
typedef struct (
    BOOL status;            /* Status of the request */
    WORD wType;             /* Type of Transport Request */
    WORD wCallId;           /* The CallId to Identify the Request */
Status_BLK;
)
```

FIG. 6

```
/*
 * Connection info
 */
typedef struct (
        DWORD dwSessId;         /* Identifies established connection     */
                                /*OII will return the handle in dwSessId when */
                                /* ReDirectOpen or ReDirectListen completes */

WORD wTransport;        /* requested transport                   */

BOOL bOpenSession;      /* True to creat a session, FALSE to use an */
                                /*existing session. (piggyback)          */

DWORD dwSessionHdl      /* handleof existing session if bOpenSession */
                                /* is FALSE. (from TRAMSLAX.DLL, OpenComm etc)*/

WORD wTimeout;          /*number of seconds before timing out, (use */
                                /*in queue mgr calls) .Set to zero to disable */

/* Status Block is updated when event Occurs */

STATUS_BLK statusBLK;
                                /* status callback when events occur     */
                                /* will be NULL in case No Callback is required */ void (WINAPI *vfpCallback) (DWORD wSessId, WORD wCallId, WORD wType,
        WORD wCount, int nStatus));

/*Use the below Block if bOpenSession    */
                                /* is TRUE and a Transport is specified in */
                                /* wTransport. Otherwise ignore.         */
             union (
                DECNET_BLK decnetBlk;
                TCPIP_BLK  tcpipBlk;
                COMM_BLK   commBlk;
                NETWARE_BLK netwareBlk;
                  .
                  .
                  .
             ) multi_transport;

GENERIC_TRANSPORT_ADDRESS manyAddress [MAX_TRANSPORT_ADDR];
        GENERIC_TRANSPORT_ADDRESS lem-loAddress;
) OII_CONTROL, far * LP_OII_CONTROL;
```

FIG. 7

```
/*Data Block */
typedef struct (
        WORD wlen ;             /*Max length of data Block*/
        LPSTR DataBuffer;       /* Pointer to Data Buffer */
)       DATA_BLK;
```

FIG. 8

```
/********LOAD.INI********/
[LOADER]
Loader=
Entry=

[TCP/IP]
LIBRARY=tcpip.xyz
transportID=1

[DECnet]
Library=decnet.xyz
transportID=2

[THIRD_PARTY_TRANSPORT]
LIBRARY= thirdParty.xyz
transportID=8

```
/* This Structure is filled by the OII. The Applications/Protocol need not
    initialize it, unix
*/
struct ( WORD wSignal;           /* Signal number used to indicate the Application control or
                                    Data Block is written
                                */
        WORD wPidApp;           /* Process Id of the Application/Protocol Engine.
                                */
        DATA_BLK DataBlk        /* The Transport Redirection Head read/writes the
                                    Data form this block
                                */
) UNIX_SPECIFIC;
```

FIG. 11

```
struct (
    WORD wInUse;           /*This flag indicates that a either OII (linked
                              to Application or Transport Redirection Deamon
                              are Updating or reading this Block
                              So back off for a While
                           */
    WORD wRedirPid;        /* Process id Transport Redirection Head Daemon
                           */
    WORD wAppPid;          /* Process id of the Application that Issues
                              the Request.
                           */
    WORD wRedirSignal;     /* Signal that Transport Redirection Head Daomon
                              intercepts
                           */
    WORD wFuncType;        /* The Type of Function that is requested by
                              Application or Completed by Transport
                              Redirection Head daemon
                           */
    BOOL LenAppBlk
                           /* kel or Identification of Shared Memory
                              Control Block of the Application
                           */
) RedirectionHeadTable;
```

FIG. 12

UNIX

/****LOAD.INI****/
[LOADER]
Loader=
Entry=

[TCP/IP]
LIBRARY=tcpip.xyz
transportID=1
SharedKey=

[DECnet]
LIBRARY=decnet.xyz
transportID=2
SharedKey=
.
.

[THIRD_PARTY_TRANSPORT]
LIBRARY= thirdParty.xyz
transportID=8
SharedKey=

VAX/VMS

/****LOAD.INI****/

[LOADER]
Loader=ImageLdr.exe
Flags=SYSTEM_GLOBAL

[TCP/IP]
LIBRARY=tcpip.xyz
transportID=1
GlobalSection=TCPVectors

[DECnet]
LIBRARY=decnet.xyz
transportID=2
GlobalSection=DECVectors
.
.

[THIRD_PARTY_TRANSPORT]
LIBRARY= thirdParty.xyz
transportID=8
GlobalSection=THIRDVectors
/****/

FIG. 14

```
/*This Structure is filled by the OII. The Applications/Protocol need not
   initialize it
*/ struct (
        BYTE byShare [MAX_SIZE];    /* This is a shared resource name to be
                                       used by Enqueue Lock Request Service
                                    */
        DATA_BLK  DataBlk;          /* The Transport Redirection Head read/writes the
                                       Data form this block
                                    */
) VMS-SPECIFIC;
```

FIG. 15

```
struct (
        WORD wInUse;                /* This flag indicates that a either OII (linked
                                       to Application or Transport Redirection Deamon
                                       are Updating or Reading this Block.
                                       So back off for a while
                                    */
        WORD wFuncType;             /* The Type of Function that is requested by
                                       Application or Completed by Transport
                                       Redirection Head daemon
                                    */
        BYTE cntrlSection [MAX_SIZE]; /* Section name for Control Block of the
                                         Application
                                      */
) RedirectionHeadTable;
```

FIG. 16

NETWORK TRANSPORT DRIVER INTERFACING

BACKGROUND OF THE INVENTION

This invention relates to network transport driver interfacing.

Referring to FIG. 1, in a typical computer network 10, a network communication medium (e.g., cabling) 12 carries information among computers attached to the medium, e.g., computers 14a, 14b, and 14c. The physical connection of each computer to the medium is made via a network interface card 16 which plugs into the motherboard of the computer. The computer includes the usual monitor, keyboard, mouse, CPU, memory, and disk storage (not shown) as well as software 18.

The software includes an operating system 20 (e.g., DOS, UNIX, DOS/Windows, or VMS, which manages the basic operation of the computer), portions 22 of a distributed network operating system, and at least one application 24.

Portions 22 of the distributed network operating system (e.g., Netware, LAN Manager, Pathworks, or Vines) cooperate with other portions of the network operating system located in other computers on the network to provide network services which enable the computers to cooperate with one another via the network medium. In addition to providing basic network communication services for applications, the network operating system may provide additional services such as implementation of remote procedure calls (RPCs) and network management functions.

An application 24 (e.g., a user application or a protocol engine such as KERMIT) communicates with the network operating system via an application interface 26. Data link software 28 controls, and communicates on the network via, the network interface card. A transport stack/driver 30 sits between the application interface and the data link.

The delivery of information on the network medium must comply with defined protocols which typically have several levels. Each transport stack/driver is typically designed to comply with a particular protocol, for example, TCP/IP, Serial Comm, CTERM, TELnet, or DECnet.

A variety of approaches have been taken in implementing application interfaces as part of network operating systems. They include socket interfaces, XTI, BSD Socket, TLI, and Microsoft's Transport Driver Interface (TDI), which is used for kernel level applications, for example for a redirector.

In the socket interface approach (e.g., Berkeley Sockets described in 4.3 BSD, available from the Regents of the University of California) when an application needs to read from or write to a remote node on the network, it opens a socket. The socket is like a virtual circuit between the local and remote computers (also called nodes). A socket is given a unique identifying number and may be closed when no longer needed. Once the socket is opened, the local node may perform read and write operations via the socket using the unique identifying number. When a read or write operation is initiated, the local node generally cannot proceed with its own further operations until it receives a confirmation that the read or write operation has been executed at the remote node. Thus the reads and writes (or other calls) are said to be performed synchronously and in a locally polled manner.

For an application to be able to make use of a transport stack/driver for a particular network protocol, the application (or an associated application interface) must be designed to communicate properly with the transport stack/driver. Thus, for example, an application that is designed to implement a KERMIT communication protocol may be written to interface correctly with a TCP/IP transport stack/driver offered by a particular vendor. The application (or the associated application interface) would have to be modified or rewritten if it were to be used with a different, say, DECnet transport stack/driver. A similar need for modification or rewriting would arise if the transport stack/driver were to be used with other than the operating system for which it was designed.

Another socket interface, WinSock, contemplates porting from UNIX to a Windows platform and between Windows environments; it supports a TCP/IP transport stack/driver. WinSock Version 1.0 provides for use of the Windows API in conjunction with the Internet Protocol Suite (IPS, also called TCP/IP). WinSock permits loading of vectors (jump addresses) of TCP/IP stacks of different vendors.

SUMMARY OF THE INVENTION

The invention enables applications to link to multiple transport stack/drivers by attaching and detaching vectors of the transport stack/drivers (jump addresses, i.e., entry points to the functions provided) dynamically. Multiple transport stack/drivers may be added to a system without requiring any change in the calling conventions at the application level. Thus transport stack/drivers can easily be added or removed from a system. The invention provides for notify callbacks from the transport stack/driver which allows asynchronous operation without requiring the application to wait for the transport stack/driver to confirm a network transport operation. The invention can be implemented on a variety of operating system platforms and provides uniform transport services across all of them. Network management functions are made easier.

Thus, in general, in one aspect, the invention features a computer-based method for permitting application programs running on a computer to obtain transport services from a set of transport service providers (e.g., transport stack/drivers) also running on the computer, thus enabling the application programs to communicate on a network to which the computer is coupled. Each transport service provider is configured to respond to transport service requests which conform to a prespecified format associated with the transport service provider. Original service requests are received from an application program. For each received original service request, a corresponding transport service request conforming to the appropriate prespecified format is delivered to the selected one of the transport service providers.

In embodiments of the invention an application program can dynamically cause inclusion of new transport service providers in the set of transport service providers running on the computer, e.g., by having the application register vectors representing jump addresses of the function entry points to said transport service provider.

Each original service request complies with a common data structure which applies to application programs and to transport service providers. The original service requests are directed to the transport service providers by storing data in a global memory and triggering global memory accesses by the transport service providers.

In some embodiments, each of the transport service providers has a native prespecified format and each original service request is directed to an appropriate mapper for mapping the request to a transport service request in an appropriate prespecified format.

In some embodiments, all of the transport service providers are adapted to accept transport service requests in a prespecified format which is the same as a common format to which the original service requests conform.

In general, in another aspect, the invention features a computer-based method for providing transport services to an application program running on a computer. In the method, an original service request is received from the application program; a corresponding transport service request is delivered to a transport service provider running on the computer; a call back is delivered to the application program to indicate completion of the requested service; and in the period after the receipt of the original service request and prior to the delivery of the call back, the application program is free to engage in activities other than waiting for completion of the requested service.

Other advantages and features of the invention will become apparent from the following description and from the claims.

DESCRIPTION

FIGS. 3 through 8 are "C" language data structures for the system of FIG. 1.

FIGS. 10 through 12, 15, and 16 are "C" language data structures.

FIGS. 13 and 14 illustrate LOAD.INI procedures for two different embodiments.

Figure 1:
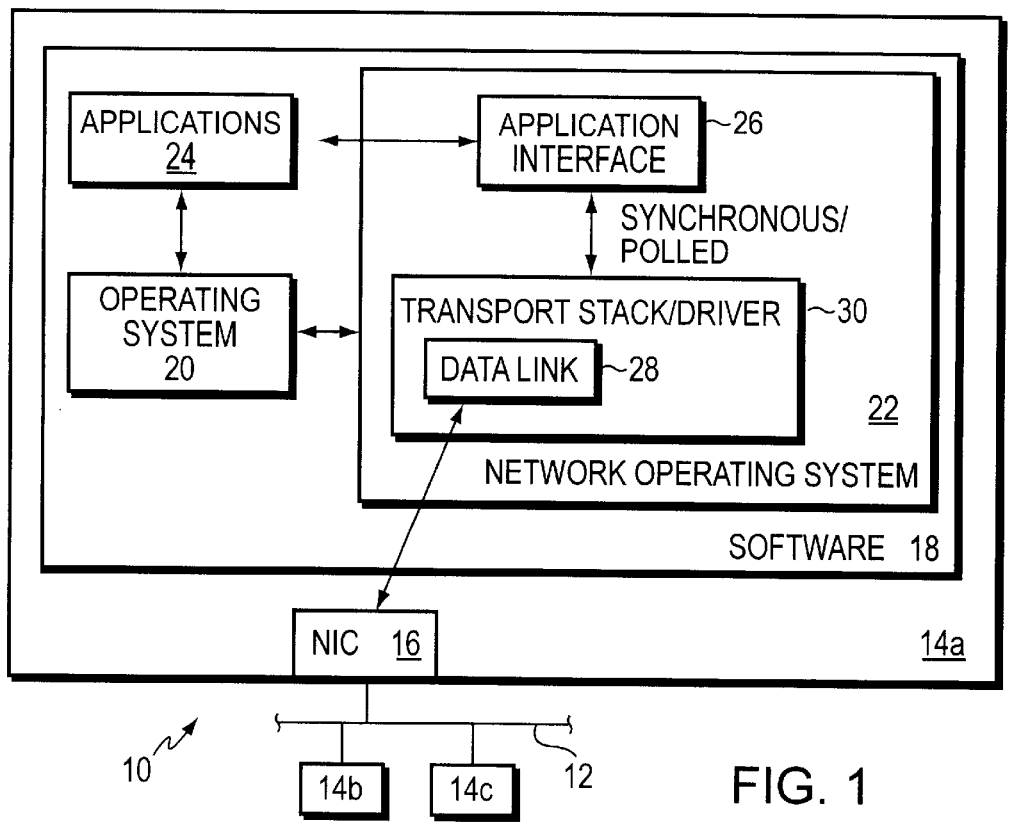
FIG. 1 is a block diagram of a network.
Figure 2:
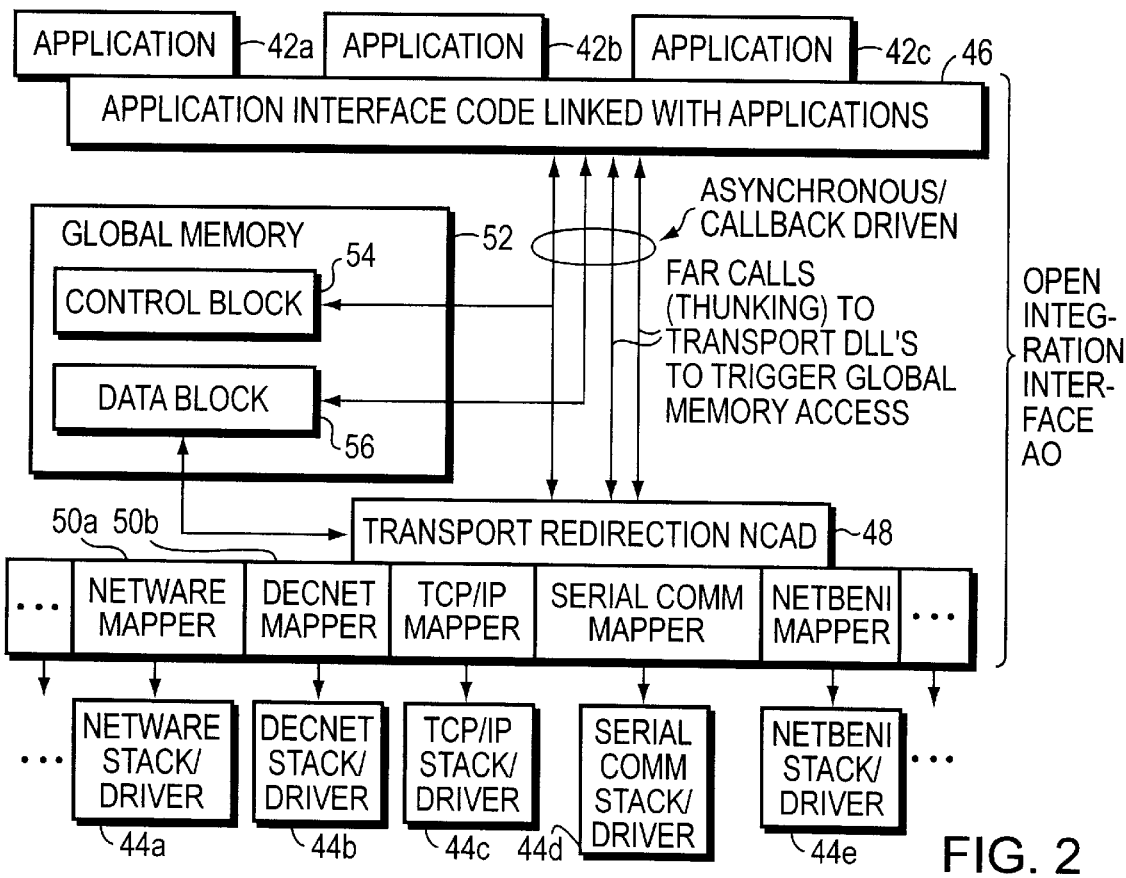
FIG. 2 is a block diagram of an open integration interface serving applications.

Referring to FIG. 2, in one implementation example useful in a Windows/DOS environment, an open integration interface (OII) 40 serves a variety of different existing or future applications 42a, 42b, 42c which may, respectively, be arranged to require the services of different existing or future transport stack/drivers 44a, 44b . . . For example, application 42a may be configured to operate with a Netware stack/driver 44a while application 42b may be configured to operate with either a TCP/IP stack/driver 44c or a NETBEUI stack/driver 44e.

OII 40 includes several elements. Application interface code 46 is linked with each of the applications. (This portion of OII will be called Application OII.). A transport redirection head 48 interfaces with the application interface code 46. A series of mappers 50a, 50b, . . . each provides a mapping function between the transport redirection head and a corresponding one of the stack/drivers 44a . . . Each mapper maps to the appropriate hooks or entry points of the transport stack/driver. A global memory 52 holds control blocks 54 and data blocks 56 which enable the Application OII and the transport redirection head to exchange information useful in effecting the network communication.

OII 40 is designed to permit any current or future transport stack/driver to be dynamically registered or deregistered with the transport redirection head. OII enables any application to use network services provided by any registered transport stack/driver. Registration involves providing to the transport redirection head specific data conforming with the registration data structure 60 set forth in FIG. 3. (This and other data structures shown in the FIGS. are in the "C" language.) The data conforming to the structure may be provided from the application itself by a RegTransport call (FIG. 3) made to the transport redirection head. The data structure represents user level entry points (Ring 3) to the transport stack/driver in the DOS/Windows environment.

The variables listed in the data structure of FIG. 3 are as follows.

wAsynch is a flag indicating whether the communication between the application and this transport stack/driver is to be asynchronous or not.

transportId is an identifier for the transport stack/driver, e.g., an identifier for a TCP/IP stack/driver provided by Digital Equipment Corporation.

lpfnDirectOpen defines information pertaining to opening of a network communication link (connection) in response to a request by an application. When is a handle to specify the location in global memory where the control information block (FIG. 7) pertaining to the opening of the link will be found. The control information block includes the following. wSessId is an identifier for a given session on the link. wcalledId identifies a particular call within a session. wType is returned in the call back and identifies the type of call, e.g., DirectOpen or DirectClose.

lpfnCallback is a function that performs the call back to pass information back to the application. The information passed back includes wCount, the number of bytes in the case of a read or write operation, and nStatus, which indicates the status of the call.

lpfnDirectClose is the function that closes a link.

lpfnDirectListen accepts the connection request if access information is appropriate.

lpfnDirectRead is a function that handles a read request. lpbBuffer is a pointer to the location in the global memory (the data block) where the data to be read is to be found.

lpfnDirectWrite handles a write request.

lpfnStatus handles a status or polling request.

specificVectors are reserved for future use in providing network management functions.

JUMP_ADDRESS is the vector (jump address or call address) of the transport stack/driver.

Stored in the transport redirection head is a simple table: JUMP_ADDRESS Multitransport [MAX_NO_ TRANSPORT] stores the jump addresses (vectors) for all of the registered transport stack/drivers that have been registered using the RegTransport call.

Once a transport stack/driver has been registered with the redirection head, an application need not register it again.

When the application is ready to use the registered transport stack/driver, it puts appropriate control information into the control block 54 of the global memory, and (in the case of outgoing data) puts the data in the data block 56 of the global memory.

Referring to FIG. 4, the information included in the control block will be specific to the transport stack/driver to which it is directed. Data structures are shown for DECNET, TCP/IP, and Serial Comm transport stack/drivers.

In the case of DECNET, the control information includes byNode (the name of the local node), byUser and byPswd (user identifier and password), bNullAccess (if set, then use the default access, e.g., DECnet uses node database PWNODE.DAT), byTask (identifies the remote application on the remote node), and wRemotePort (identifies the remote object or port).

The data structure for TCP/IP is similar, except that it includes wLocalPort (a local port number).

For Serial Comm, the data structure includes a variety of variables that involve control of the modem.

The actual station or hardware address on the network for the node under the transport protocol may be expressed in the form shown in FIG. 5. wTransport identifies the transport stack/driver; wAddLen is the transport address word length. bAddress is the address itself.

In FIG. 6, the data structure for the status block includes status, and wType and wCallId (which serve to identify the type of request and the particular call). The status block is part of the control block.

In the OII control block (FIG. 7, and FIG. 2, item 54), the handle dwSessID identifies a connection. Its value is assigned by the transport redirection head and is returned as a call back to Application OII. The next call sequence uses dwSessID to identify a connection. wTransport identifies the requested transport stack/driver. bOpenSession is TRUE to create a session, FALSE to use an existing session. In the latter case, dwSessionHdl is the handle of the existing session. If bOpenSession is TRUE and a transport stack/driver is specified, then the transport redirection head uses the dwSession Hdl for the next sequence for transport requests.

The data structure for a data block stored in the global memory (FIG. 8) includes when (the maximum length of the data block) and DataBuffer (a pointer to the data buffer).

The example of FIGS. 2 through 8 is useful in environments where each transport stack/driver provides a native transport interface in its upper layer, e.g., the DECnet stack/driver which provides IOCB functions for the transport interface in its upper layer. In such a situation, to establish a connection the application sends a DECnet control block via the global memory to the transport redirection head. The transport redirection head acts on the control block by calling the DECnet mapper which then translates the OII control block to a corresponding native control block for the DECnet transport stack/driver. Thus each transport stack/driver retains its normal native transport interface and the mappers provide the translations necessary for interaction with the transport redirection head.

Figure 9:
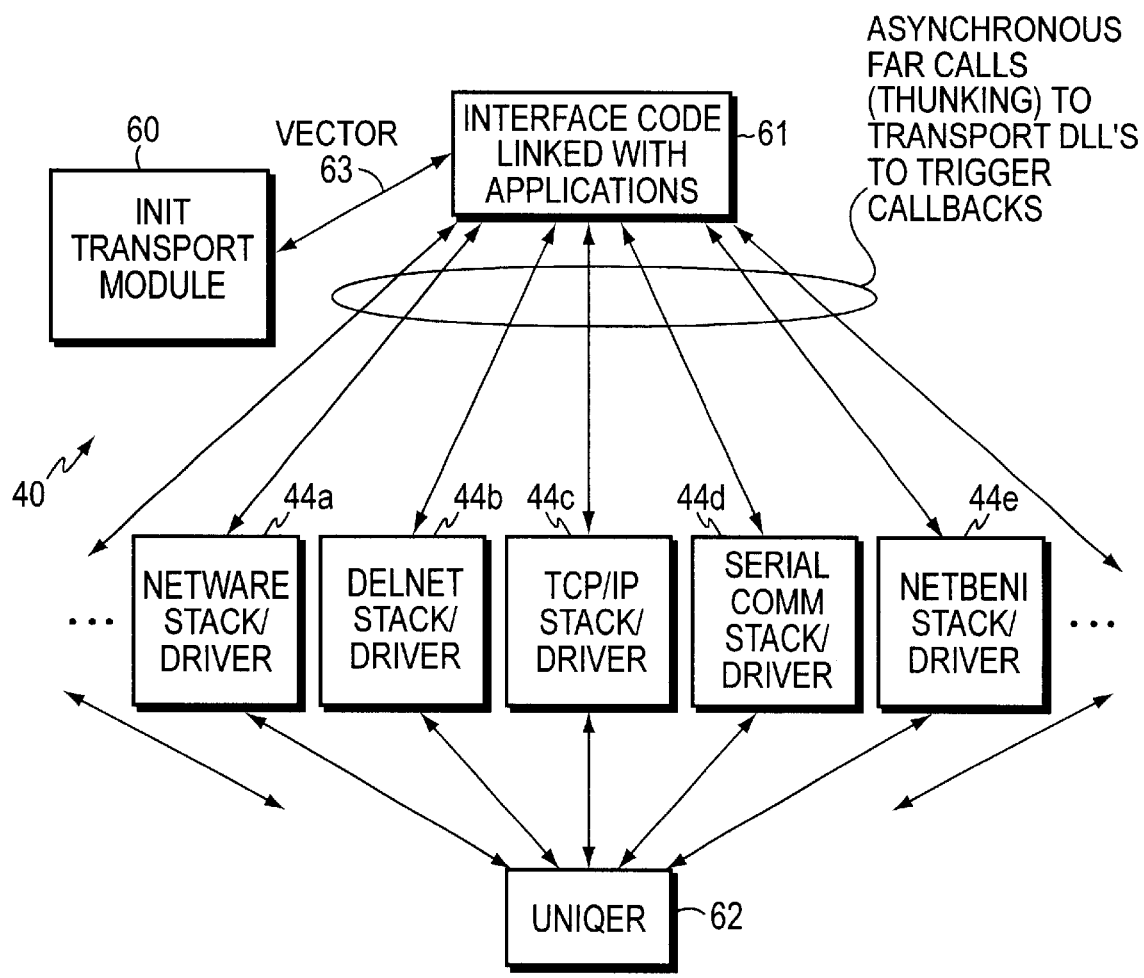
FIG. 9 is a block diagram of another implementation of an open integration interface.

Referring to FIG. 9, in an alternative embodiment, each of the transport stack/drivers 44a, 44b, . . ., has its upper layer specially configured to comply with the specification of (i.e., provide hooks to) the OII. This eliminates the need to have a redirection head or dedicated mappers for the respective transport stack/drivers. Instead the transport stack/drivers may communicate directly with the Application OII 61. The communication is in the form of asynchronous/FAR calls (thunking) made to transport stack/driver dynamic link libraries, DLLs, to trigger callbacks on completion of transport requests. Thunking is a Windows concept.

Instead of registering a new transport stack/driver with the redirection head, the function vectors of the transport stack/driver are attached to Application OII by sending them from the application layer to the Init Transport Module 60 (the vector table as shown in FIG. 3).

It is the responsibility of the application to store the JUMP_ADDRESS vectors (JUMP_ADDRESS table, FIG. 3) from the DLL (dynamic link library) or other libraries that provide user mode (Ring 3) entry points to the transport stack/driver using the RegTransport call. Alternatively, the application can request the Application OII to register the JUMP_ADDRESS table. Registering the JUMP_ADDRESS table includes loading the transport stack/driver and attaching the transport stack/driver vectors. For registering the JUMP_ADDRESS table, OII provides a 'LOAD.INI' file with the format shown in FIG. 10. In FIG. 9, the Init Transport Module 60 reads the LOAD.INI file. Module 60 may be linked to the Application OII; it returns the global memory handle to the JUMP_ADDRESS table (vector 63, FIG. 9) of the transport stack/driver.

If the loader is not specified in LOAD.INI, OII loads the library as a DLL using the Init Transport Module. The Init Transport Module stores the JUMP_ADDRESS table in the global memory. The JUMP_ADDRESS table stores the vectors and transport identification. The Init Transport Module returns the global handle to the Application OII.

If the loader is specified in LOAD.INI, the OII triggers the loader through the Init Transport Module. The loader copies the vectors of the transport stack/driver to the global memory (FIG. 9). The loader returns the handle of the global memory to the Application OII. If the transport stack/driver vectors are already stored in global memory, then the Init Transport Module returns the global memory handle to the Application OII.

As in the previously described embodiment, after the registration of the transport stack/driver to OII, the applications need not register the transport stack/driver again. They are merely required to pass the proper access information in order to use the transport interface. The access information is described in the control block. The control block and data block are the same as those shown for the previously described embodiment (FIGS. 4 and 8).

In the present embodiment, the OII (rather than the redirection head) decides which transport stack/driver to direct the transport calls, because the OII has the address to the vector table.

For asynchronous input/output operations the transport stack/driver calls back (thunks) the application (linked to the OII) on completion of the transport request.

In order to keep track of the different sockets or ports opened by the various transport stack/drivers, a uniqer 62 returns a unique number to a transport stack/driver when requested. The number is then passed by the transport stack/driver to the application for use in identifying the socket or port or session. The uniqer is not required for certain operating systems.

Other embodiments may be implemented with respect to platforms other than DOS/Windows, e.g., UNIX and VMS.

In the case of UNIX for example, the architecture would be the same as shown in FIG. 2 except that global memory 52 would become a shared memory and the mechanism for communication between the application interface code 46 and the transport redirection head 48 would be user signals to trigger a shared memory access.

The UNIX implementation uses the same data structures as shown in FIGS. 3 through 8, with the following differences.

1. The redirection head table (FIG. 12) is created by the redirection head daemon. It contains the key for the control block in shared memory. This table is unique to the redirection head daemon and is read from LOAD.INI (FIG. 13). When the Application OII makes a transport request to the redirection head daemon, it updates the wFuncType, AppPid, KeyAppBlk, and wInUse flag. It reads the wRedirPid and wRedirSignal and sends a signal to trigger a transport request. In the data block data structure when is replaced by wDatasize, which indicates the bytes of shared memory requested.

2. An additional data structure, shown in FIG. 11 is filled by OII. wSignal is used to indicate that the control block or data block has been written. wPidApp is the process ID of the application. DataBlk is written/read by the Application OII. Application OII signals the redirection head to trigger a transport request.

3. In the OII control block there is an additional variable, UNIX_SPECIFIC unixblk which is initialized by Application OII when it calls DirectOpen or DirectListen.

In the UNIX environment, the implementation uses signals to communicate between the transport redirection head and the Application OII to indicate that a control block or data block has been updated or read. The control block is unique to each application as before.

Initially the shared memory block (redirection head table) is created by the transport redirection head daemon. The shared memory block data structure has a unique path name and is shown in FIG. 12.

wInUse allows either the Application OII or the transport redirection daemon to indicate to the other that the redirection head table is being updated or read. wRedirPid is the process ID of the redirection head daemon. wAppPid is the process ID of the application that issues a request for services. wRedirSignal is the signal that the transport redirection head daemon intercepts. wFuncType identifies the type of function that the application requests or wFuncType that the daemon has completed. keyAppBlk is the key or identification of the shared memory control block written by the Application OII.

The table of FIG. 12 is read by all of the applications linked to OII. The OII initializes the keyAppBlk and sets the wInUse flag before sending the signal to the transport redirection head. The transport redirection head daemon resets the wInUse flag after reading the keyAppBlk. The daemon attaches the control block and data block using keyAppBlk for processing the transport request.

To establish a connection, an application (linked to OII) signals the transport redirection head that a control block has been updated. The transport redirection head calls the appropriate mapper to translate the OII control block to the native control block of the transport stack/driver.

The callback is simulated by Application OII when the transport redirection head daemon sends the signal to the OII. The OII signal handler simulates the callback.

Another implementation, useful with UNIX may be implemented in a fashion similar to the one shown for DOS/Windows in FIG. 9.

Other differences from previously described embodiments include the following.

The 'LOAD.INI' file is read by Application OII. If the loader is not specified, OII loads the library (entry points to the transport stack) as the UNIX device driver, and stores the JUMP_ADDRESS table with the vectors and transport identification.

If the loader is specified, the loader loads the shared library and also writes the vectors (function entry points) to a shared memory table. The shared memory table has a unique key for each transport stack address, and is read by LOAD.INI. The shared memory table is readable by all Applications OII and have the same data structures as the JUMP_ADDRESS table.

For asynchronous I/O the transport stack/driver signals the application on completion of the transport request. The OII simulates a callback to the application on intercepting the signal through a signal handler.

Another embodiment for use with VMS is like the one shown for DOS/Windows in FIG. 2, but the shared memory becomes a shared/locked memory, and the communication between the transport redirection head and the Application OII is by an enqueue lock request service to trigger a shared memory access. The data structures for this embodiment (FIGS. 14–16) are similar to the ones shown for UNIX except as follows.

The VMS specific data structure (FIG. 15) filled by OII with respect to the enqueue operation includes a variable byShare which is the name of the shared resource to be used in connection with the enqueue lock request service. Application OII reads and writes to the data block. DirectOpen and DirectListen initialize the control block and redirection head table.

Initially the transport redirection head creates a global section table, having a unique name and of a form shown in FIG. 16. The unique name for the section can be read from LOAD.INI.

The redirection head table (FIG. 16) is read by all Applications OII. Before sending a transport request, Application OII updates the control block and data block. OII also initializes the redirection head table with the section name for the control block and sets the wInUse flag. Before sending asynchronous system traps (ASTs, through $ENQ system call) to the transport redirection head. The transport redirection head resets the wInUse flag after reading the control section name.

To establish a connection, an application writes to the control block and releases the lock ($ENQ) on it. The transport redirection head gets an AST (asynchronous system trap) when OII releases the lock through the enqueue lock request service. The transport redirection head calls the appropriate mapper to translate the OII control block to the native control block on receiving the AST.

The call back is simulated by the OII when the transport redirection head releases the lock on control block resource. Application OII gets an AST and simulates a callback to the application.

In another embodiment for use with VMS, the architecture and data structures are similar to those shown and discussed for the second UNIX embodiment described above except as follows.

In setting up the LOAD.INI file note that the transport stack provides the upper layer as shareable images. The loader loads the vectors (jump addresses) or the entry points of the transport stack to the global section table. The global section table should be unique for a particular stack driver and readable by OII applications and should have the same structure as the JUMP_ADDRESS table. The unique name for this global section (JUMP_ADDRESS table) is read from the LOAD.INI.

For asynchronous I/O, the transport stack/driver locks a named resource (using $ENQ system service) on the transport request from the application. It releases the lock on the named resource on completion of the transport request.

Other embodiments are within the scope of the following claims.

What is claimed is:

1. A computer-based method for permitting application programs running on a computer to obtain transport services from a set of transport service providers enabling the application programs to communicate on a network to which the computer is coupled, each transport service provider being configured to respond to transport service requests which conform to a prespecified format associated with the sport service provider, comprising:

receiving service requests from an application program, and for each received service request, delivering to a selected one of the transport service providers a corresponding transport service request conforming to the prespecified format appropriate to the transport service provider; and, generating a call back to said application program in response to completion of said transport service request, said call back enabling said application program to continue executing, thereby allowing asynchronous operation of said application program.

2. A computer-based method for permitting application programs running on a computer to obtain transport services from a set of transport service providers enabling the application programs to communicate on a network to which the computer is coupled, each transport service provider being configured to respond to transport service requests which conform to a prespecified format associated with the transport service provider, comprising:

receiving service requests from an application program, and for each received service request, delivering to a selected one of the transport service providers a corresponding transport service request conforming to the prespecified format appropriate to the transport service provider;

enabling an application program, in the event that a selected transport service provider is not registered as running on the computer, to dynamically register said selected transport service provider in the set of transport service providers running on the computer, and to execute said transport service request by said selected transport service provider; and, generating a call back to said application program in response to completion of said transport service request, said call back enabling said application program to continue executing, thereby allowing asynchronous operation of said application program.

3. A computer readable media having instructions for performing the steps of the method of claim 1 or claim 2 written thereon.

4. Electromagnetic signals propagating over a computer network containing instructions for performing the steps of the method of claim 1 or claim 2.

* * * * *